United States Patent [19]
Wolff et al.

[11] 3,834,814
[45] Sept. 10, 1974

[54] BOOK COPIER

[75] Inventors: David F. Wolff, Glenn Ellyn; Herman O. De Boer, Wheaton; Emil Tiger, Highland Park; James G. McCarthy, Park Ridge, all of Ill.

[73] Assignee: Sunbeam Business Equipment Co., Addison, Ill.

[22] Filed: Mar. 27, 1969

[21] Appl. No.: 810,968

[52] U.S. Cl. .................................... 355/51, 355/65
[51] Int. Cl. .......................................... G03b 27/70
[58] Field of Search ................ 355/51, 8, 27, 65, 66

[56] References Cited
UNITED STATES PATENTS

| | | | |
|---|---|---|---|
| 3,045,539 | 7/1962 | Dupre | 355/51 |
| 3,352,218 | 11/1967 | Ostensen | 355/27 X |
| 3,421,816 | 1/1969 | Robertson et al. | 355/8 |
| 3,450,474 | 6/1969 | Sloan et al. | 355/27 |

Primary Examiner—Samuel S. Matthews
Assistant Examiner—Richard A. Wintercorn
Attorney, Agent, or Firm—Hill, Gross, Simpson, Van Santen, Steadman, Chiara & Simpson

[57] ABSTRACT

A book copier including a cabinet having an upwardly opening exposure aperture with illuminating means within the cabinet trained into the aperture and an optical system for scanning the aperture and transmitting an image therefrom to a copy element, has a carriage reciprocably mounted thereon to transport an original to be scanned across the aperture, and means for driving the carriage reciprocably comprising a coupling rack reciprocable with the carriage and respective driving gears alternatively operable on the rack to drive it and thereby the carriage in respective opposite direction. An electrically operated means controlled by the copy element synchronizes operations and the driving means with movements of the copy element past an exposure aperture. A multiple copy selector is arranged to be manually set to control the driving means for repeating reciprocations of the carriage for production of multiple copies and the carriage cycles the selector means by a trip arm on the carriage operating a selector cycling lever system.

32 Claims, 9 Drawing Figures

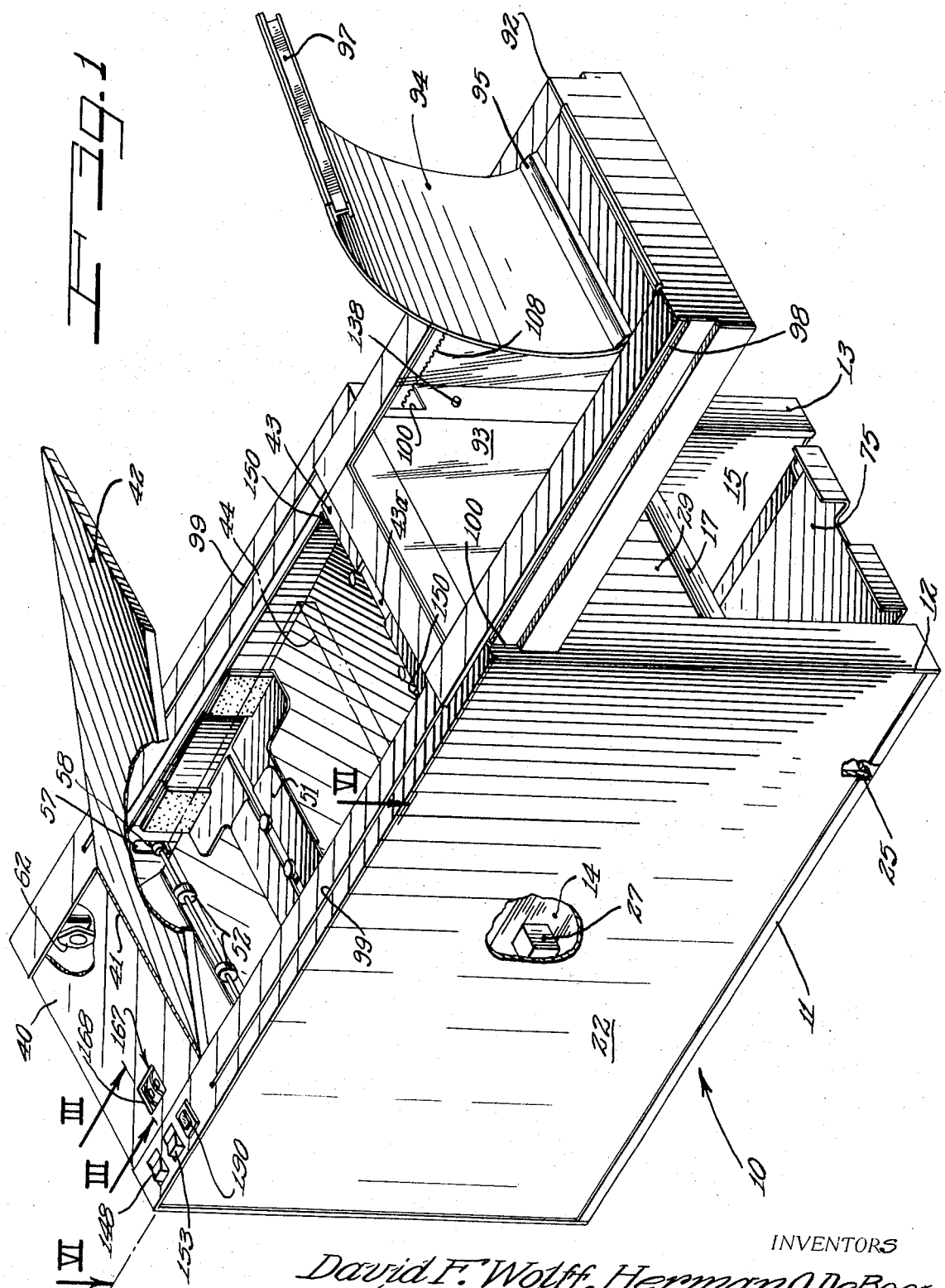

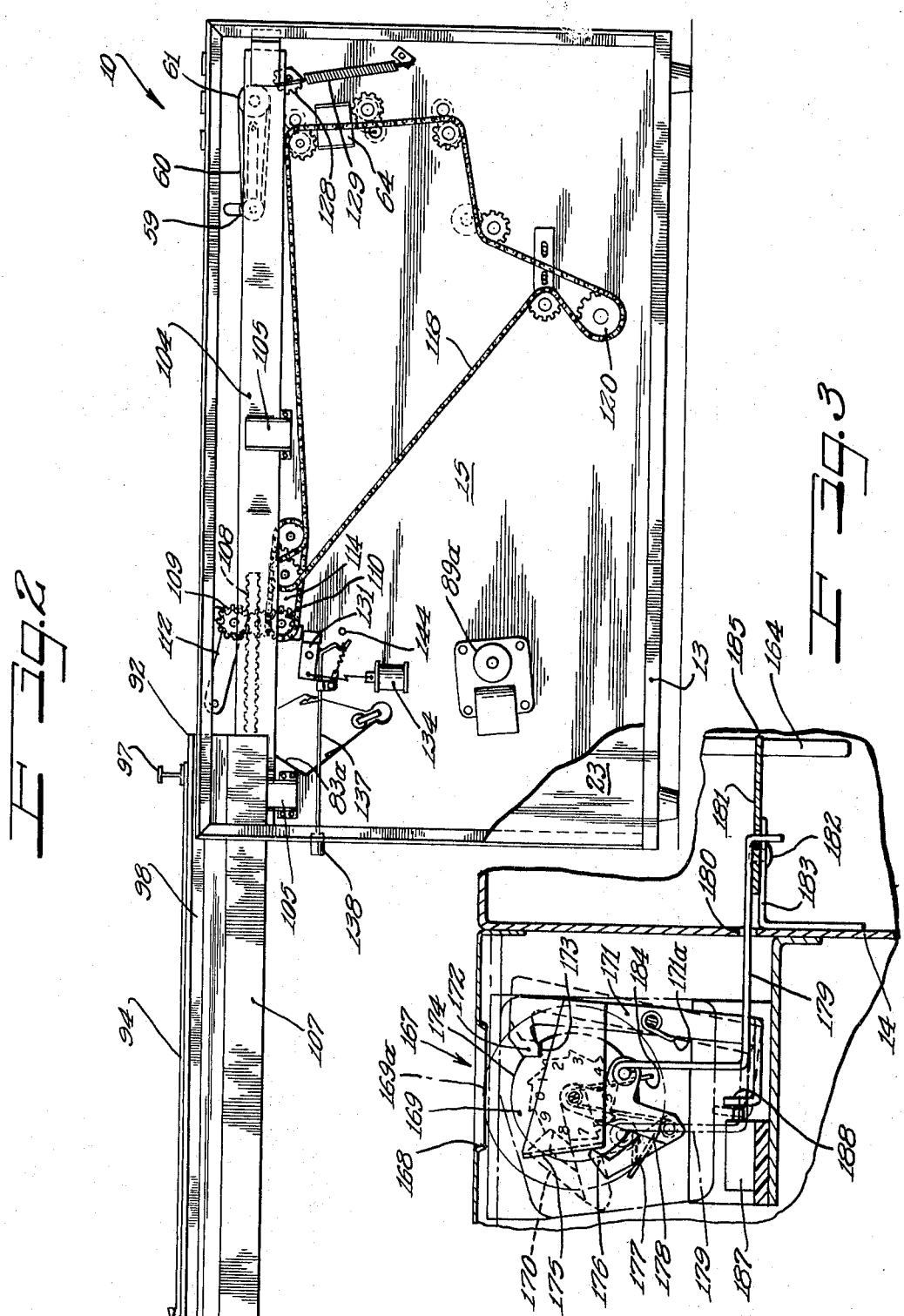

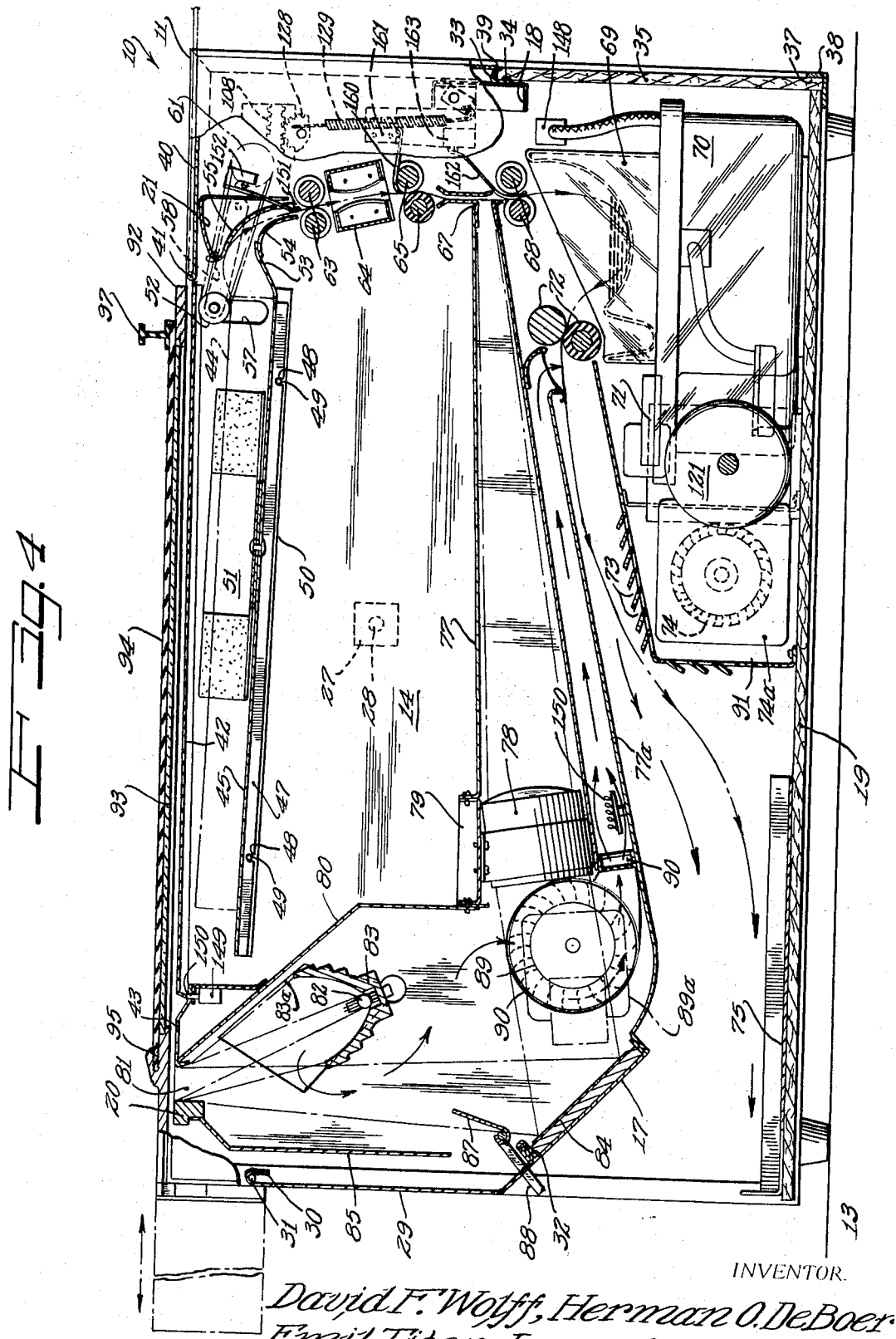

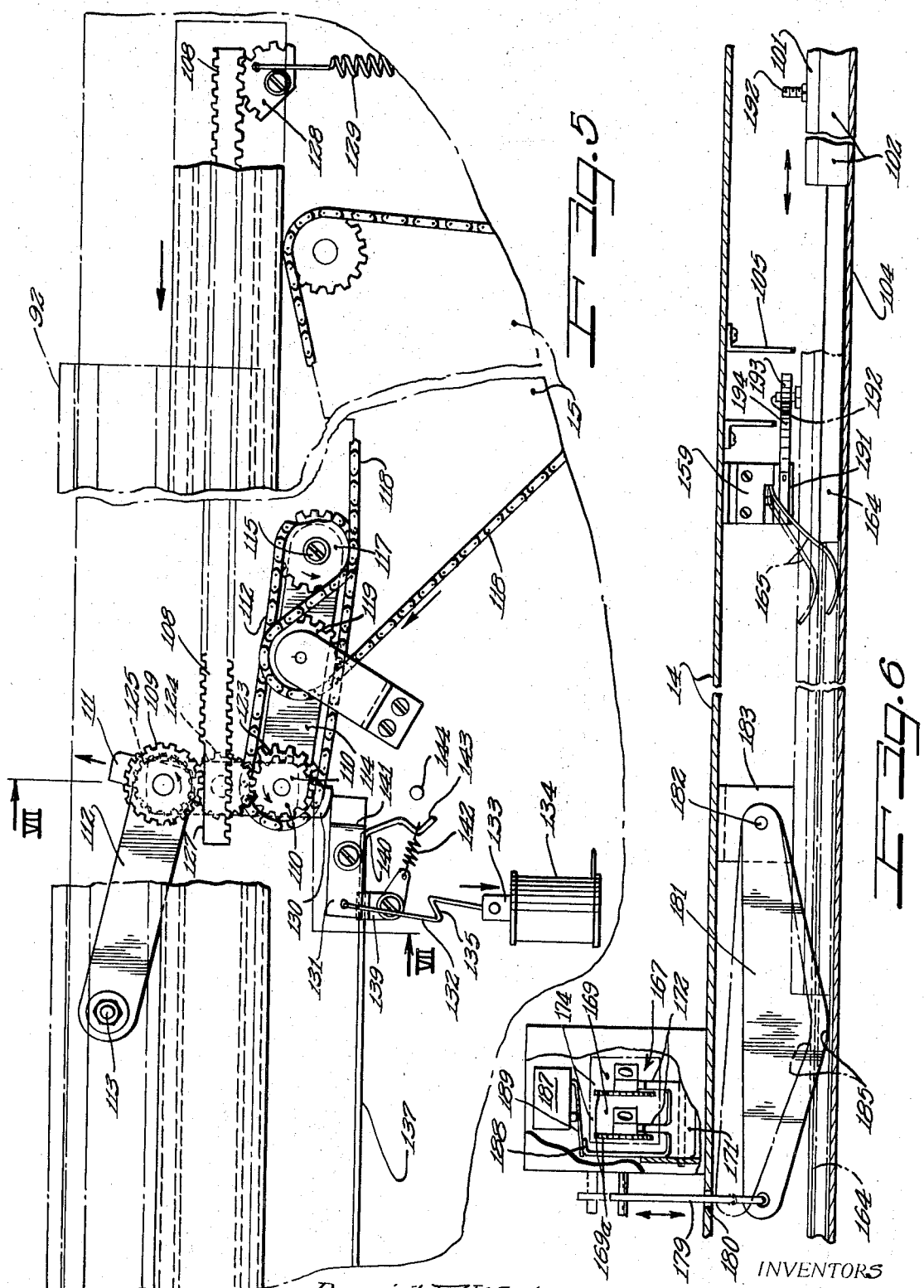

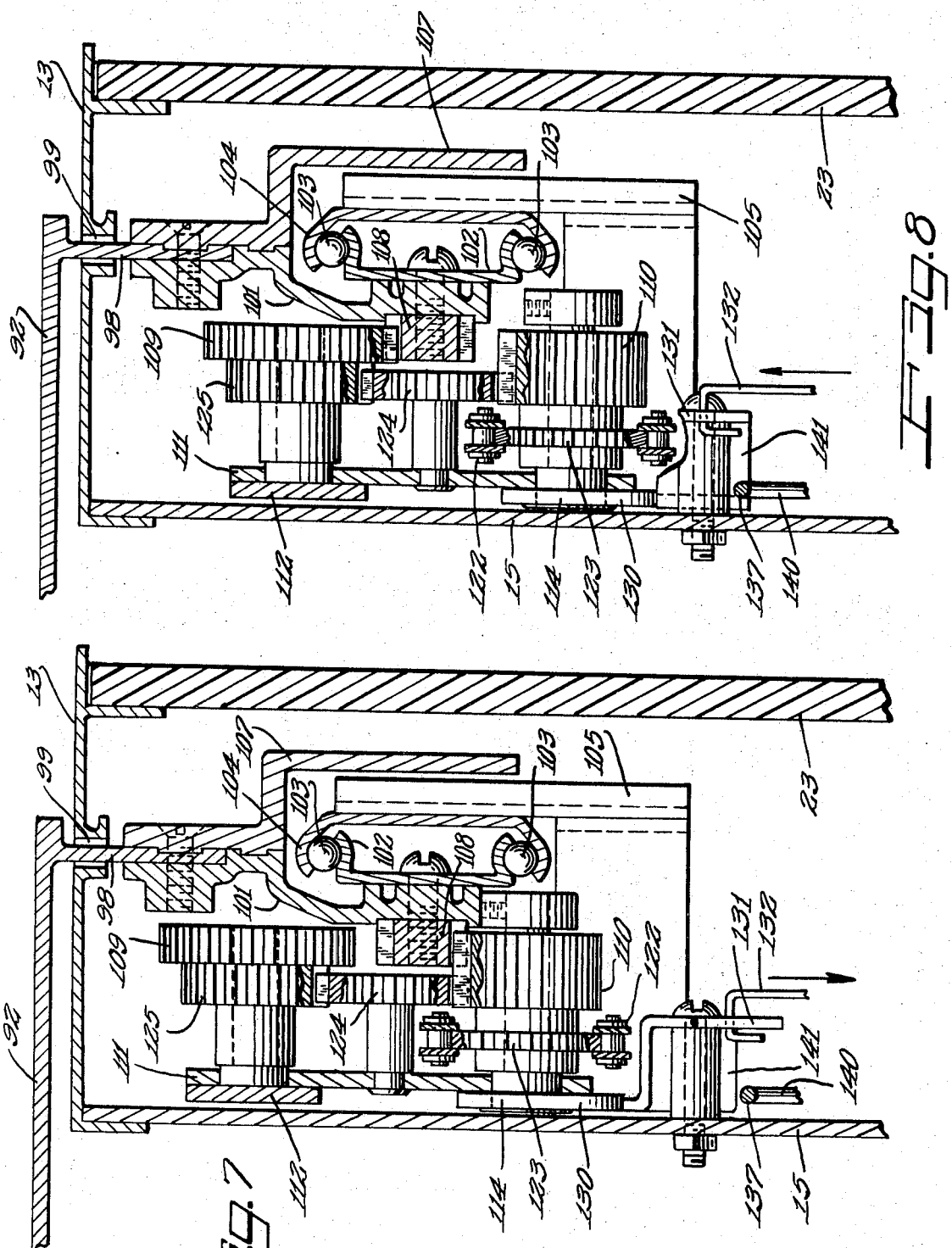

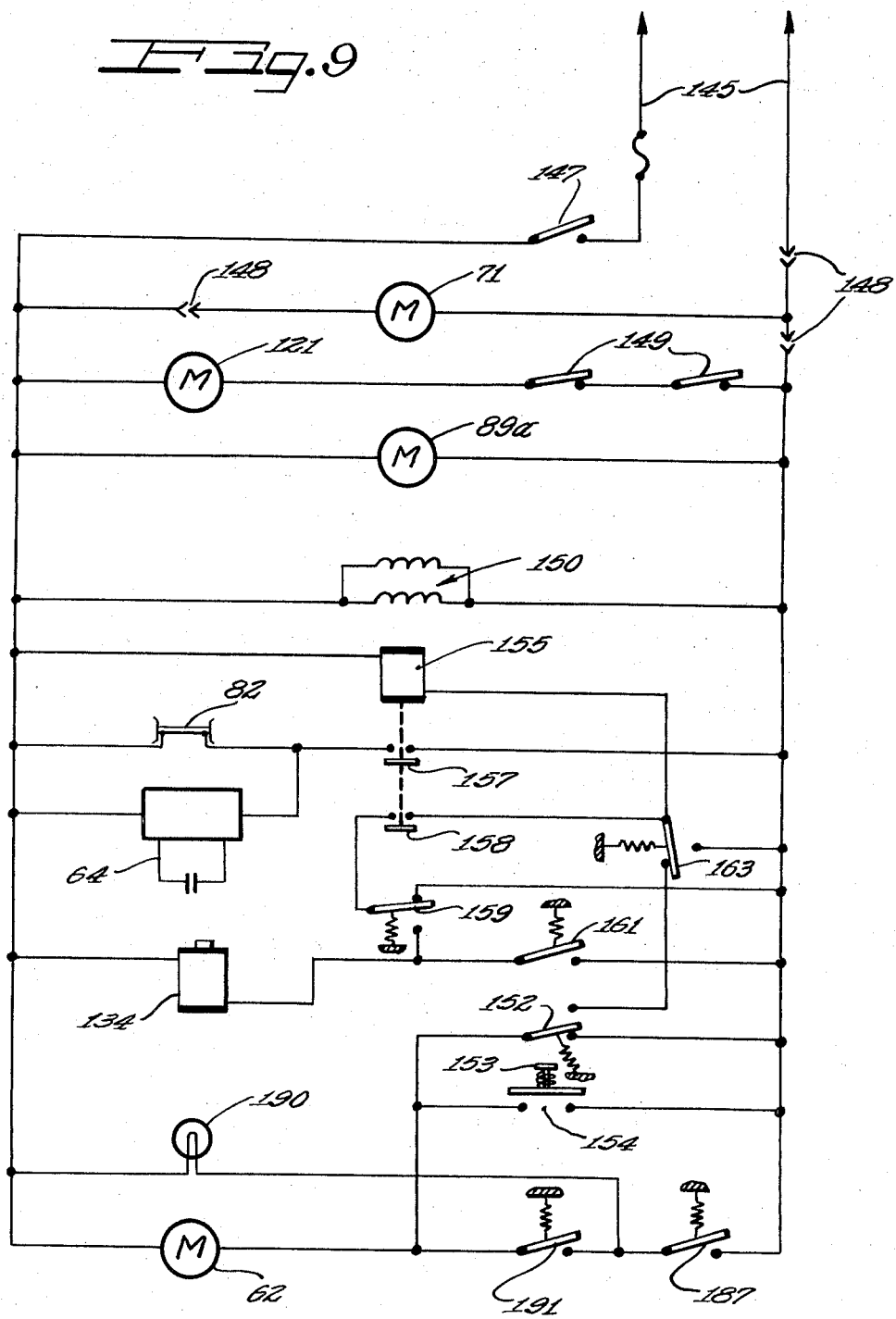

BOOK COPIER

This invention relates to a new and improved book copier and is more particularly concerned with an arrangement which is particularly suitable for electrostatic copying machines. Although book copiers, as such, have been proposed, a salient characteristic has been a general complexity of mechanism and operating controls. For example, such copiers have had reciprocating copy transporting carriages which, in early developments, have been cyclically slow. Attempts have been made to increase the speed of operation but with ever-increasing complexity in the operating mechanisms and controls and corresponding increase in the end cost of the machines. Generally reliance has been on electro-magnetic clutches for controlling the driving mechanisms associated with the reciprocating carriages. Not only are electromagnetic clutches costly, but they are a source of failure under highly repetitive operating conditions, in addition to having relatively high power requirements and requiring sophisticated and sometimes complex electrical auxiliaries including costly relays, switching equipment, and the like. In addition to the high cost of such prior carriage operating systems there is the considerable servicing problem due to the numerous electrical components liable to malfunction or failure, and the necessarily crowded condition within available space, especially in the popular table model size of machine.

Similar remarks apply to prior arrangements for multi-copy selection which has generally been accomplished by increased electrical gadgetry in the system, further complicating the original equipment cost factor, liability to failure and service problems as well as available space crowding.

The foregoing and other deficiencies, complexities and disadvantages of prior constructions are overcome by the present invention according to the principles of which simple, low cost, largely mechanical means are provided not only for reciprocably driving the copy transport carriage, but also for operating a multi-copy selector, with minimum electrical integrating and control circuitry.

An important object of the present invention is to improve the operation and control of reciprocal carriage book copiers, and to provide a new construction thereof.

Another object of the present invention is to provide a new and improved means for reciprocably driving a document transport carriage of a copying machine such as an electrostatic copier.

A further object of the invention is to provide new and improved multi-copy selector means for copy machines having a reciprocal copy transport carriage.

Still another object of the invention is to provide a new and improved means for controlling the operation of a reciprocal document transport carriage in an electrostatic copier.

Still another object of the invention is to provide new and improved copy transport carriage means in a copy making machine.

Other objects, features and advantages of the present invention will be readily apparent from the following detailed description of a preferred embodiment thereof, taken in conjunction with the accompanying drawings, in which:

FIG. 1 is an isometric view of a copy making machine embodying features of the invention;

FIG. 2 is a side elevational view of the machine with the side cover panel on that side broken away to reveal details of the simple driving means of the machine;

FIG. 3 is an enlarged fragmentary sectional detail view taken substantially along the line III—III of FIG. 1;

FIG. 4 is a side elevational view similar to FIG. 2 but with the side panels substantially broken away to reveal internal features of the machine;

FIG. 5 is an enlarged fragmental side elevational view showing details of the reversible drive for the carriage;

FIG. 6 is an enlarged fragmental sectional plan detail view taken substantially along the lines VI—VI on FIG. 1;

FIG. 7 is an enlarged sectional detail view taken substantially along the irregular line VII—VII on FIG. 5;

FIG. 8 is a view similar to FIG. 7 but showing the parts in another operative relation; and FIG. 9 is an electrical control schematic diagram for the machine.

A copy making machine 10 (FIGS. 1, 2 and 4) in this instance of the electrostatic copier type comprises a cabinet, preferably of rectangular form and neatly housing mechanical and electrical components of the machine in a compact table top model. To this end, the cabinet 11 comprises a pair of vertical quadrangular side frames in substantially mirror image relation to each other and desirably constructed from extruded aluminum sections, namely a left side frame 12 and a right side frame 13. Each of the frames has respective similar front, top, rear and bottom bar sections substantially rigidly connected together and being of substantial width so that to the inner margins of the frame bars of the left hand frame 12 is secured a vertical side panel 14 which may be an aluminum plate, and to the inside margins of the frame bars of the right side frame 13 is secured a similar side frame panel 15. Secured to and between front portions of the panels 14 and 15 is a connecting frame bar 17 and secured to and between the rear margins of the side panels is a connecting frame bar 18. Supported by and fixedly secured to the bottom bars of the frames is a horizontal base panel 19. There are additional reinforcing members secured to and between the side plates 14 and 15, such as for a top structure and including a bar 20 near the upper front end portions thereof and a bar 21 adjacent to the upper rear end portions thereof, and which together with other frame structures of the cabinet attain a substantially rigid housing structure.

To provide a neat outer appearance, while enabling access into various mechanism areas within the cabinet, as desired, suitable closure panels are provided, comprising similar respective left and right side closure panels 22 and 23 each of which is received at its bottom edge in a longitudinal groove 25 (FIG. 1) in the base bar of the associated respective cabinet frames 12 and 13. Releasable attachment of the panels 22 and 23 may be effected in any preferred manner, such as by means of a respective attachment block 27 fastened on the inner face of the panel and secured to the adjacent side wall panel by means of a removable screw 28 (FIGS. 1 and 4). At the front, the cabinet 11 has an upper removable generally vertical closure panel 29 which has on its upper end margin a turned over hanger flange 30 removably engageable on inwardly extending retaining pins 31 on the front bars of the cabinet frames 12 and 13, and spaced forwardly adjacent to and below the top bar 20. For attachment of its lower end, the panel 29 has a lower marginal hook flange 32 which is engageable over an edge portion of the frame bar 17. At the rear of the cabinet a two-part panel arrangement is provided comprising an upper panel portion 33 removably secured as by means of screws 34 to the frame bar 18, and a lower panel portion 35 which is seated at its lower edge within a groove 37 in a lower rear transverse frame bar 38 while the upper edge of the panel portion 35 is frictionally retained by a shoulder 39 on the lower margin of the panel 33. On top, the cabinet 11 has a permanently secured top panel portion 40 extending between the rear portions of the upper frame bars of the side frames 12 and 13 to which is pivotally attached as by means of a piano hinge 41 a closure or lid panel 42 which is adapted to be raised for access into the cabinet from the top. At its front edge, the lid 42 rests on a frame bar 43 secured to and between the upper portions of the side frames of the cabinet, with a manipulating digit clearance 43a inset in the bar at the lid seat.

Within the cabinet 11 are means for producing copies of original documents, in the present instance comprising electrostatic reproduction means of the type in which photostatically sensitive copy paper sheets are fed through an exposure zone in synchronized relation to movement of an original through a scanning zone and liquid toner development and fixing of the electrostatically charged image to which the sensitive paper has been exposed. To this end, the upper portion of the cabinet is provided under the access lid 42 with a magazine adapted to support a stack of electrosensitive copy paper 44. In a desirable form the magazine comprises a removable tray comprising a plate 45 having respective opposite side flanges 47 provided with downwardly opening notches 48 engageable upon inwardly extending respective pins 49 on fixed spacer rail bars 50 secured to the inner faces of the upper portions of the respective side wall panels 14 and 15. Supported on the body plate of the tray 45 is a slidably adjustable side edge paper guiding gauge 51 to hold the paper square for feeding by means of a friction feed roller 52 into a rearwardly and downwardly directed feed throat provided by an upwardly and rearwardly directed rear end guide flange 53 on the magazine body plate which laps a downturned throat bar 54 (FIG. 4) cooperatively related to a complementary spaced rearwardly and downwardly turned deflector throat plate 55 associated with the frame bar 21. The shaft of the feed roller 52 at its opposite ends extends through respective clearance slots 57 (FIGS. 1, 2 and 4) in the cabinet side wall panels 14 and 15 and is rotatably supported by the respective rearwardly extending arms 58 which are pivoted on the side wall panels. Driving of the feed roller 52 is through a pulley 59 corotative on its shaft and driven by a belt 60 trained over a drive pulley 61 driven by a motor 62 mounted on the side wall panel 15 under the top closure panel portion 40.

From the feed throat between the guides 54 and 55, each successive copy sheet is received in the nip of advancing or conveyor rollers 63 which continue feeding of the copy paper on through a corona charging device 64, and thence to the nip of further conveyor rollers 65 which drive the copy paper through an exposure aperture device 67 through which an image of a document is exposed on the electrostatically charged copy paper which is then fed onward by a succeeding set of conveyor rollers 68 into a developer tray 69 which is supplied with liquid toner from a tank 70 by means of a pump driven by a motor 71. The tray and tank assembly is adapted to be replaceably inserted into the cabinet through a doorway afforded by removal of the rear wall panel 35. After passing through the liquid toner, the developed copy sheet is advanced by a further set of conveyor rollers 72 over a perforated air drying and sheet advancing device 73 within which is a centrifugal impeller blower 74. Thence, the copy sheet descends to a receiving tray 75 accessible through an opening in the front of the cabinet below the frame bars 17.

An image from an original document to be copied is optically impinged through the exposure aperture 67 by way of a rearwardly extending light tunnel 77 from a lens system 78 supported by a reinforcing bracket bar 79 extending between and supported by the side wall panels 14 and 15 of the cabinet, spaced forwardly from the front wall of the cabinet and supporting the lower edge of a light shield panel 80 the upper end of which is supported by the transverse bar 43 which, together with the transverse bar 20 spaced therefrom defines a scanning aperture 81 extending across the top of the cabinet between the side frames 12 and 13. For illuminating the face of a document presented to the scanning aperture 81, a lamp 82 is mounted within a parabolic reflector 83 which is supported on and between the side wall panels 14 and 15 having lamp access openings 83a. The reflector is spaced below the bar 43 and adjacent to the shielding panel 80, rearwardly clear of a substantially vertical scanning path from the aperture 81 to a rearwardly tilted mirror 84 mounted on the bar 17 and optically aligned with the lens system 78 to reflect the scanned image through the lens system and thence through the tunnel 77 to the exposure aperture 67. Forwardly from the vertical scanning path between the aperture 81 and the mirror 84 and spaced inwardly from the front enclosure plate 29 is a generally vertical shield plate 85 having its upper end associated with the bar 20 and blocking escape of light from the lamp 82 past the upper end of the front panel 29, as will be evident from FIG. 4. The plate 85 has its lower end adjacent to but spaced from the upper forward edge of the frame bar 17 whereby to afford a clearance for mounting a lower end of the front cover plate 29. For image, and thus copy color, intensity modulation a light valve plate 87 is mounted to be pivotally swung to the desired degree in the scanning path through manipulation of a lever 88 accessible adjacently below the inturned lower portion of the front housing panel 29 of the cabinet.

Cooling of the substantially closed illuminating and scanning compartment between the lens system 78 and the scanning aperture 81 is effected by at least one centrifugal evacuation fan 89 and preferably two such fans each having its own drive motor 89a and respectively mounted on the wall panels 14 and 15 adjacent to the lens system 78. Thereby cooling air is drawn into the chamber through the scanning aperture 81 and other air openings including access openings 83a at the opposite ends of the reflector 83, as well as from between the front closure 29 and the shield 85. Such air is then exhausted by the impellers 89 by way of a transverse air duct 90 and rearwardly through an air duct 77a along the bottom of the light tunnel 77 and directed from the front end of the duct onto the developed copy papers as they leave the squeeze and conveyor rollers 72 to accelerate drying of the copies. Additional air is drawn by the impeller fan 74 through an aperture 91 in the panel 14 aligned with the drying and air impelling device 73 and expelled through the apertures in the device 73 onto the copy sheets as they move forwardly toward the tray 75.

For transporting a document original across the scanning aperture 81 a reciprocal carriage 92 is mounted on the top of the cabinet 11. In a desirable form, the carriage comprises an open rectangular frame preferably constructed from lightweight metal such as aluminum and providing a scanning opening therethrough of substantially the same width as the length of the scanning aperture 81 and of a substantial length to adapt relatively long documents such as legal size and accounting form sizes of documents to be accommodated in addition to documents that may have substantial three-dimensional characteristics such as books, bound files, and the like, a transparent such as glass supporting panel 93 being carried over the frame opening. To hold the original to be copied on the glass panel 93 and to shield against undesirable light escape through or alongside the original during scanning, a flexible hold-down panel 94 is secured at one end within a clamping jaw 95 fixed on preferably the front end portion of the carriage frame, and has on its opposite end a manipulating handle 97.

Means are provided for guiding the carriage 92 reciprocably over the top of the cabinet 11. For this purpose, the carriage frame is provided with respective longitudinally extending depending flanges 98 at each opposite side (FIGS. 1 and 7) which extend downwardly through longitudinal clearance slots 99 in the top frame bars of the cabinet frames 12 and 13, with suitable clearance openings 100 aligned therewith in the front bars of the cabinet frames. Under the associated top frame bar, each of the flanges 98 has secured thereto a runner bar 101 carrying a runner 102 arranged to ride on anti-friction means such as ball bearings 103 in a longitudinal track bar 104 supported by suitable longitudinally spaced brackets 105 on the respective adjacent side wall panels 14 and 15. A protective skirt flange 107 is secured to the outer side of each of the flanges 98 and extends downwardly along the outside of the brackets 105 in generally concealing, protective relation to the track bar 104. Through this arrangement, the carriage 92 is enabled to travel reciprocably from a fully retracted position to a fully protracted position to carry the transparent exposure panel from end to end over the exposure aperture 81.

Simple and efficient means are provided for driving the carriage reciprocably, comprising a coupling member in the form of a double-sided rack 108 (FIGS. 2, 5 and 7) reciprocable with the carriage 92 and respective drivers alternately operable on the coupling member to drive it and thereby the carriage in respective opposite directions, namely, a pinion 109 which operates to drive the rack and thereby the carriage toward and into the retracted position, and a pinion 110 which is operable to drive the rack and thus the carriage into the protracted position. The arrangement is such that both of the pinions 109 and 110 are continuously driven and are shiftably mounted to be alternately operable. To this end, both the pinions are mounted in freely rotatable relation on a common bracket bar 111 with the pinion 109 in this instance located to act on rack teeth on the upper side of the rack 108 and the pinion 110 located to act on rack teeth on the lower side of the rack 108. Mounting of the bar 111 for generally vertical reciprocal movement is by way of a pair of links comprising an upper link 112 which is pivotally attached to the upper end portion of the bar 111 and extends forwardly therefrom and is attached by a pivot 113 to the associated wall panel 15. A corresponding lower link 114 is pivotally attached to the lower end portion of the bar 111 and extends generally rearwardly therefrom and is pivotally attached to the panel 15 as for example on a shaft 115 on which is mounted a twin sprocket 117 over which is trained a drive chain 118 which also drives various sprockets attached to shafts of the several sets of copy paper conveyor rollers, is trained over an idler sprocket 119 adjacent to the twin sprockets 117 and is driven by a driving sprocket 120 (FIG. 2) on the shaft of a drive motor 121 (FIG. 4) mounted in the bottom of the cabinet. While the machine is in operation, the chain 118 is continuously driven and the twin sprocket 117 continuously drives a continuous sprocket chain 122 which is trained over a sprocket 123 which is corotatively mounted with the pinion 110 desirably in the form of a twin gear meshing with a transmission gear 124 rotatably mounted on the bar 111 between the pinions and meshing with a gear 125 common and corotative with the pinion 109 which is desirably of larger diameter than the pinion 110 for returning the carriage at greater speed than protractional or outward movement effected by the pinion 110 during scanning of a document original.

Normally the gear train assembly comprising the pinions 109 and 110, and mounting and driving assembly, gravitationally maintain the upper pinion 9 in its rack-meshing relation. Therefore that portion of the rack which underlies the pinion 109 in the fully retracted or returned position of the carriage 92 is free from rack teeth and provides a blank slip surface area 127 (FIG. 5) so that after the pinion 109 runs off of the last rack tooth adjacent to the blank area, the pinion will slide freely on such blank area. By having the pinion 109 of nylon or similar material, friction and wear are minimized. To assure full at rest retracted retention of the carriage and to assure complete clearance of the rack teeth relative to the pinion 109 as well as to avoid vibrationally induced or unintentional protractional displacement of the carriage a yieldably biased check device is provided comprising a segmental gear 128 (FIGS. 2 and 5) pivotally mounted on the panel 15 under the innermost end portion of the rack 108 in its retracted position and meshable with the rack in such position, with an over-center tension spring 129 attached to the check gear. The arrangement is such that the spring 129 holds the check gear 128 in a ready position when the carriage is protracted, and as the carriage is returned, the lower teeth on the inner end portion of the rack 108 mesh with the check gear, turning it until the spring 129 moves overcenter and places a return drive torque terminal inward thrust on the check gear operative to take over the final increment of return movement of the rack 108 as the driving pinion 109 leaves the rack teeth for the free slip area 127.

Means are provided for shifting the pinion gear train upwardly to effect meshing of the normally clear driving pinion 110 with the teeth along the lower edge of the rack 108. For this purpose, the forward end portion of the lower link 114 has a depending lug 130 under which is operatively located one end portion of a first class lever 131 intermediately pivoted on the panel 15 and having pivotally attached to its opposite end portion a depending link 132 pivotally attached at its lower end portion to an armature 133 of a solenoid 134 mounted fixedly on the panel 15. The solenoid is operative when the carriage is to be protracted to retract the armature 133 downwardly and thus through the link 132 rock the lever 131 to thrust upwardly on the lug 130, shifting the pinion 110 into driving meshing engagement with the rack 108 and lifting the pinion 109 above and clear of the rack teeth, as is shown in FIG. 7. Outward or protraction driving of the carriage continues until the solenoid 134 is deenergized, permitting the rack-driving gear train to drop so that the pinion 110 drops out of mesh relative to the rack 108 and the pinion 109 drops into mesh therewith as shown in FIG. 8 and the carriage is immediately moved in the return direction, since the pinions are continuously driven in the respective opposite driving directions for which they are intended. By having the solenoid connecting link 132 constructed of bendable wire, an intermediate angular offsetting bend 135 therein enables ready adjustment in length of the link to attain optimum lag-free response when the solenoid 134 is energized.

To enable manual shifting of the carriage 92, means are provided for manually neutralizing the pinions 109 and 110 relative to the rack 108. For this purpose a longitudinally extending neutralizing rod 137 (FIGS. 2 and 5) is provided having a readily accessible digitally operable push-button 138 at its front end projecting through the front vertical bar of the cabinet side frame 13. At its inner end portion the rod 137 is slidably supported by a bracket 139 such that a cam head 140 is located immediately forwardly adjacent to an angular offsetting shoulder 141 on the inner end portion of the lever 131 (FIGS. 5 and 8). Normally the rod 137 is maintained in its inactive, retracted position by biasing means comprising a tension spring 142 attached to the bracket 139 and to an arm 143 which is a downward extension from the cam portion 140 of the rod. When it is desired to neutralize the pinions for manual inward or outward movement of the carriage, the button 138 is pushed inwardly which moves the rod 137 in opposition to the bias of the return spring 142 and the cam 140 thrusts the shoulder 141 upwardly to neutralize the pinions relative to the rack. Desirably a stop 144 limits the inward movement of the neutralizing rod 137. Promptly upon release of the neutralizing button 138, the rod 137 is snapped by the spring 142 into return inactive position and the pinion gear train returns to its carriage returning relationship of the pinion 109. In order to avoid interference with the operation of the machine, the neutralizing rod 137 is effective only when the solenoid 137 is inactive, the shoulder 141 being raised above the cam 140 during the outward scanning movement of the carriage (FIG. 7).

Electrical control means are provided for automatically cycling the carriage 92 responsive to the transport of each copy sheet 44 through the exposure aperture 67. For this purpose an electrical circuit (FIG. 9) comprises means for connection into a power source such as a 110-volt power line and comprising a customary connecting plug represented at 145. When it is desired to start operation of the machine a master or power control switch 147 is closed as by manipulation of an operating button 148 (FIG. 1) on a conveniently accessible portion of the cabinet 11. This will start the drive motor 121 operating, provided certain safety interlocks permit the circuit to the motor to be closed, namely, proper connection of a jack plug 148 (FIGS. 4 and 9) to connect the pump motor 71 in the circuit so that it will also start running, and closing of a pair of safety switches 149 by depressing of respective switch actuators 150 (FIGS. 1 and 4) by the free edge of the cover 42. Thereby, the motor 121 will operate only if the copy development assembly is properly hooked into the circuit and only if the top cover of the machine is properly closed. Operation of the motor 121 in addition to effecting operation of the drive chain 118 also effects operation of the blower fan 74 through a gear box 74a (FIG. 4). Closing of the switch 147 also sets into operation the fan motor 89a and any other fan motor of similar character in the machine. At the same time an air heating element 150 (FIGS. 4 and 9) located in the copy drying air delivery duct 77a is adapted to be energized. If the copy paper magazine has just been freshly supplied with copy paper 44, and there is no sheet of the copy paper fed beyond the magazine, closing of the power switch 147 also initiates the feeding of the first copy sheet into the delivery throat ahead of the conveyor rollers 63, by energizing of the paper feed motor 62. Just before the leading edge of the copy paper thus fed out by the feed roller 52 reaches the conveyor rollers 63, a switch arm 151 (FIG. 4) is actuated by the paper to trip a double acting switch 152 to open the power circuit through the motor 62 and stop the paper feed until a start button 153 (FIG. 1) on the cabinet 11 is depressed at least momentarily to close a normally open starting switch 154 through which a copying cycle is initiated by shunting across the switch 152 and starting the feed motor 62 to effect advance of the copy paper into the nip of the continuously running conveyor rollers 63.

While the copy paper maintains the switch arm 151 depressed, the switch 152 closes across a contact in a circuit including a relay 155 so that when the starting switch 154 is momentarily closed, the relay is energized to close a contact 157 of an energizing circuit for the charging corona 64 and the scanning lamp 82. At the same time the relay closes a contact 158 through a two-way holding switch 159 to maintain the relay energized after the manual switch 154 is released. Upon emerging from the corona device 64, the leading edge of the copy paper depresses a switch arm 160 of a switch 161 which completes an energizing circuit through the carriage-advancing solenoid 134 and scanning traverse of the carriage is initiated. The leading edge of the copy paper now advances through the conveyor rollers 65 which propel the paper on through the exposure aperture 67 synchronized with scanning of a document on the carriage 92. As the leading edge of the exposed copy paper leaves the exposure aperture it depresses a switch arm 162 which throws a two-way switch 163 into a power circuit bypassing the contact 157 and the switch 159 to maintain the relay 155 energized as long as the copy paper is travelling under exposure through the aperture 67. Just after the switch 163 is tripped from its normal position by the copy paper, the switch 159 is permitted to trip to a normal position across the circuit with the switch 161 by withdrawal of an inwardly extending rigid finger 164 (FIG. 6) projecting from the runner 102 on the left side of the carriage 92 from displacing engagement with a switch arm 165 in its path. As the trailing end of the copy paper leaves the switch operating arm 160, the switch 161 returns to its normally open position. However, since the holding switch 163 is still under the control of the copy paper through the switch arm 162, the solenoid 134 remains energized through the contact 158 and the switch 159. As the trailing end of the exposed copy paper leaves the conveyor rollers 68 after exiting from the exposure aperture 67, the switch arm 162 is released and the relay is deenergized to open the contacts 157 and 158 thereby turning off the corona device 64 and the scanning lamp 82 as well as deenergizing the drive solenoid 134 and the carriage 92 is automatically started on its rapid return traverse. In so doing, the inwardly extending rigid finger 164 trips the switch arm 165 of the switch 159 to operate the switch in opposition to its bias and connect with the power line in readiness for the next copying cycle.

As soon as the trailing end of the preceding copy paper has left the switch arm 151, the switch 152 returns to its normal position (as shown in FIG. 9) wherein a circuit is automatically closed through the paper feed motor 62. Thereby, the next succeeding copy paper sheet 44 is advanced into the feed throat and engages the switch operator 151 to break the power circuit through the switch 152 and stop the feed motor until another copy making cycle is initiated. For single copy operation, the starting switch 154 must be closed manually for each copy demanded.

Means are provided for automatically recycling the machine to produce a desired number of copies up to a desirable limit. For this purpose a copy selector 167 (FIGS. 1, 3 and 6) is provided, mounted in a control area at the top rear of the cabinet 11 and accessible through a window opening 168 in the top closure panel 40 adjacent to the switch operators 148 and 153. In a desirable form, the multiple copy selector comprises a self-cancelling counter having a plurality of ten-digit, coordinated ratchet wheels 169 which are normally at a zero setting but are adapted to be turned by manipulation through the window 168 of respective knurled rims 169a to effect a desired setting of the wheel arrangement up to, in this instance, 100 copies. At zero setting, respective advancing pawls 170 for the index wheels are inactivated by an intermediately pivoted control lever 171 biased by a spring 171a to drop respective detents 172 on one end thereof into respective neutral or zero notches 173 in otherwise cylindrical cam surfaces 174 on the wheels 169. Thereby, a shoulder 175 operated by the lever 171 thrusts against a disabling finger 176 rigid with the pawls to retain the pawls inactive in opposition to the normal bias of a spring 177. Upon setting the selector wheels 169 for any desired number of copies, at least one of the detents 172 is cammed out of its notch 173, thus backing the shoulder 175 away from the finger 176 and releasing the pawls 170 for operation. The lever 171 does not return to the pawl-disabling position until both of the selector wheels 169 are in or have returned to the zero position.

Operation of the pawls 170 oscillatably to advance the selector wheel or wheels by digit increments is effected by rocking of a pivotally mounted pawl carrier 178 through the medium of an angular link 179 which extends outwardly through hole 180 in the side wall panel 14 and is operatively attached to a rear end portion of a cam lever 181 which is pivotally mounted at its opposite end through a pivot connection 182 on a fixed bracket 183. Normally the link 179 and the cam lever 181 are biased outwardly by means such as a spring 184 into the full line position shown in FIGS. 3 and 6 and wherein the pawls 170 are retracted by the rocker member 178 into a ready position. In this relationship, a lateral intermediate cam projection 185 on the lever 181 is disposed in the path of the carriage finger 164 which, on engaging with the cam projection 185 rocks the lever 181 about the pivot 182 to drive the link 179 inwardly, thus rocking the rocker 178 to move the pawls 170 in a one-digit advancing thrust on the appropriate ratchet, assuming that the shoulder 175 has been retracted by a multi-copy setting of the selector. Where the selector is at zero, the lever, link mechanism merely idles the pawls by interaction of the disabling shoulder 175 and the finger 176.

Assuming that the selector 167 has been set for one or more copies in addition to a first copy produced by initiating a copying cycle upon pressing the start button 153, the carriage finger 164 is retracted as the carriage moves outwardly in a scanning traverse, the lever 181 is released and the spring 184 causes the pawl mechanism to retract into a ready position. Then, as the carraige 92 returns, the finger 164 activates the lever 181 and causes the selector pawl mechanism to advance the selector by one-digit. At the same time, the electrical circuit is controlled for automatically recycling the machine to produce another copy and continues to recycle until the selector reaches the zero condition. In the electrical circuit, a normally open selector switch 187 (FIGS. 3, 6 and 9) is closed by action of a thrust foot 188 on the cam-rocked lever 171 displacing a switch operating arm 189. The switch 187 is therefore held closed as long as the lever 171 is cammed out of neutral position, that is, as long as the setting of the selector demands one or more additional copies. Upon closing of the switch 187, a multi-copy light 190 (FIGS. 1 and 9) is turned on. In addition, while there is multi-copy demand a normally open feed motor control switch 191 (FIGS. 6 and 9) in series with the switch 187 operates when it is momentarily closed by tripping engagement of a stud 192 projecting from the left hand runner 101 of the carriage with a cam hump 193 on the end portion of a switch arm 194 suitably located in the path of the stud. Momentary closing of the switch 191 while the swwtch 187 is closed by-passes the starting switch 154 and operates the feed motor 62 long enough to advance the next succeeding copy sheet from the copy feed magazine throat into the nip of the conveyor rollers 63 so that a full copying circle is initiated. Opening of the selector switch 187 and extinguishment of the lamp 190 indicates that the desired number of copies has been produced, or if the lamp 190 remains on and the carriage 92 remains in its home position, it will indicate that the supply of copy paper in the magazine has been exhausted. A continuation of the copying program must then be resumed, after replenishing the copy paper supply, by pushing the start button 153, whereafter if the multi-copy selector is still set for additional copies, the additional copies will be produced automatically.

It will be understood that variations and modifications may be effected without departing from the spirit and scope of the novel concepts of this invention.

We claim as our invention:

1. In a book copier including a cabinet having an upwardly opening original-scanning aperture, illumination means within the cabinet trained into said aperture, an optical system for scanning said aperture and transmitting an image therefrom to a copy element, a carriage reciprocably mounted on said cabinet to transport an original to be scanned across said aperture, and means for driving said carriage reciprocably between a starting position and an opposite position relative to said aperture, the improvement comprising:

a member mounted on said carriage;

respective drivers alternately operable on said member to drive it and thereby said carriage in respective opposite directions; and means for selectively activating said drivers.

2. In a book copier according to claim 1, said member comprising a rack having respective sets of teeth along opposite edges, and said drivers comprising respective oppositely rotatable pinions.

3. In a book copier according to claim 2, a common supporting member rotatably mounting said pinions with their peripheries spaced apart a greater distance than the width of said rack through said teeth, means on said supporting member driving said pinions, and means operable for selectively reciprocably moving said supporting member to effect alternate driving engagement of the pinions with the respective teeth of the rack.

4. In a book copier according to claim 3, means for holding said supporting member selectively in a position wherein both of said driver pinions are in a neutral position free from the respective rack teeth and said carriage may then be manually reciprocated.

5. In a book copier according to claim 4, said holding means comprising a push button accessibly mounted on said cabinet, a push rod normally biased into a released position and having an operating cam thereon, said supporting member having a shoulder engageable by said cam for moving said supporting member into the neutral position of said pinions by pressing on said button in opposition to the bias on said rod.

6. In a book copier according to claim 1, said member comprising a rack mounted along one side of the carriage adjacently spaced from a vertical wall of the cabinet, said rack having respective upper and lower sets of teeth, said drivers comprising respective pinions, a support rotatably mounting said pinions, means mounting said support in generally vertically reciprocal relation on said wall with one of said pinions above the rack and the other of said pinions below the rack and with the perimeters of the pinions spaced apart greater than the width of the rack through said teeth, said support being normally in a lower position wherein the upper pinion is drivingly related to the rack, means operating to drive the upper pinion normally to return the carriage to a starting position and to drive the lower pinion in a direction to drive the carriage from said starting position, and means for selectively raising said support to lift the upper pinion from its driving relation to the rack and effecting driving meshing of the lower pinion with the lower rack teeth.

7. In a book copier according to claim 6, said means for selectively raising said support comprising a lever mounted on said wall, and a selectively operable solenoid to operate said lever.

8. In a book copier according to claim 7, said solenoid having an armature, a bendable wire link connecting said solenoid with said lever, said link having an intermediate angular offsetting adjustment bend therein bendable to adjust the length of the link.

9. In a book copier according to claim 1, said cabinet having an exposure aperture therein, said copy element comprising a sensitized copy sheet, means for conveying said copy sheet across said exposure aperture to receive thereon the optically transmitted image, and means controlled by the copy sheet for operating said drivers.

10. In a book copier according to claim 9, said means for operating the drivers comprising a solenoid, an electrical control circuit for said solenoid, and switch means operated by the copy sheet for controlling operation of the solenoid.

11. In a book copier according to claim 1, said cabinet having a top, said carriage having respective opposite side depending longitudinal supporting flanges, said top having slots therein through which said flanges depend, runners on said flanges, tracks supported by said cabinet and along which said runners are reciprocably operably supported, said mounted member carried by one of said runners, and said drivers being supported by the cabinet.

12. In a book copier according to claim 11, said cabinet having an inner vertical panel located inwardly from said track, means on said panel supporting said track, said panel supporting said drivers, and a removable closure panel on said cabinet outwardly relative to said track defining with said inner panel a mechanism compartment within the cabinet.

13. A book copier according to claim 12, comprising within said cabinet an exposure aperture, a copy element magazine within the cabinet, means for transporting a copy element from the magazine to and across said exposure aperture synchronized with transportation of an original by said carriage across said scanning aperture, means for driving said transporting means, means for driving said drivers located within said compartment, and a common power source for said transporting means and said driver driving means.

14. In a book copier according to claim 1, said copy element being electrostatically chargeable, a corona charging device in said cabinet, an exposure aperture in said cabinet serially alligned with said corona device, a liquid toner developing unit removably mounted in said cabinet serially following said exposure aperture, means for transporting said element successively through said corona discharge device, said exposure aperture and said developing unit, said developing unit including a pump and an electrical motor driving said pump, an electrical power motor within said unit, means coupling said power motor for driving said drivers and said transporting means, an electrical circuit supplying power to said motors, and a separable jack interlock connecting said developer unit motor in said circuit and disconnecting said circuit relative to said power motor when the jack is separated as when said unit is removed from the cabinet.

15. A book copier according to claim 1, said cabinet having a top over which said carriage is reciprocable between a starting position over the top and a protracted position wherein a substantial area of said top is clear, a door in said area of the top arranged to be opened for gaining access into the upper portion of the cabinet, means for operating said drivers comprising an electrical circuit, and safety switch means controlling said circuit and normally opened when said door is open and closed by said door when it is in its closed position, whereby said drivers will operate only when said door is closed.

16. A book copier according to claim 1, said cabinet having a top over which said carriage is reciprocably movable and having a substantial area clear of the carriage in one reciprocal position of the carriage, an access door in said top, a copy element magazine within the upper portion of said cabinet under said door and accessible by opening said door, exposure aperture means in said cabinet, and means for transporting copy elements from said magazine to and through said exposure aperture means.

17. A book copier according to claim 16, said scanning aperture being located in the top of the cabinet beyond one end of said door and an adjacent end of said magazine.

18. In a book copier according to claim 1, including a check device cooperable with said mounted member in a starting position of said carriage to retain the carriage against unintentional displacement.

19. A book copier according to claim 1, a multi-copy selector on said cabinet and means controlled thereby to effect automatic repeated cyclical reciprocations of the carriage when a plurality of copies are desired of a single original, and means on said carriage for driving said selector.

20. In a book copier including a cabinet having an upwardly opening original-scanning aperture, illumination means within the cabinet trained into said aperture, and an optical system for scanning said aperture and transmitting an image therefrom to a copy element:

a carriage reciprocably mounted on said cabinet to transport an original to be scanned across said aperture;
means for driving said carriage reciprocably;
multi-copy selector means normally inactive and having means adapted to be manually set for a desired number of copies of an original transported by said carriage and when set controlling said driving means to operate said carriage through the selected number of reciprocations;
means on said carriage normally riding idly therewith but operative when the selector means has been manually set to cycle said selector means in each full reciprocal movement of the carriage until the set number of copies has been produced;
said selector means including a cam lever; and
said means on the carriage comprising a cam operating member operatively engageable with said lever.

21. In a book copier including a cabinet having an upwardly opening original-scanning aperture, illumination means within the cabinet trained into said aperture, and an optical system for scanning said aperture and transmitting an image therefrom to a copy element:

a carriage reciprocably mounted on said cabinet to transport an original to be scanned across said aperture;
means for driving said carriage reciprocably;
multi-copy selector means normally inactive and having means adapted to be manually set for a desired number of copies of an original transported by said carriage and when set controlling said driving means to operate said carriage through the selected number of reciprocations;
means on said carriage normally riding idly therewith but operative when the selector means has been manually set to cycle said selector means in each full reciprocal movement of the carriage until the set number of copies has been produced;
said selector means comprising a pawl and ratchet mechanism;
said means on said carriage comprising a finger projecting therefrom;
an oscillatable cam lever mounted on the cabinet in the path of said finger; and
a link connecting said lever operatively with said pawl and ratchet mechanism.

22. In a book copier according to claim 21, said selector means including a disabling device effective on said pawl and ratchet mechanism in a zero condition of the selector means.

23. In a book copier including a cabinet having an upwardly opening original-scanning aperture, illumination means within the cabinet trained into said aperture, an optical system for scanning said aperture and transmitting an image therefrom to a copy element and a carriage reciprocably mounted on said cabinet to transport an original to be scanned across said aperture:

means operative for driving said carriage reciprocably between a starting position and an opposite position relative to said aperture, comprising a longitudinally extending rack having upwardly extending teeth and mounted on said carriage;
a continuously running pinion carried by said cabinet and positioned above said rack and normally operative to mesh with said rack teeth to drive said carriage in a return direction to said starting position and leaving said teeth when the rack is substantially in the starting position; and
selectively active means for raising said pinion above said teeth to enable movement of said carriage toward said opposite position.

24. A book copier according to claim 23, said rack having a toothless area slidably supporting said pinion when it leaves said teeth upon the carriage reaching said starting position.

25. A book copier according to claim 23, having an over-center spring biased check gear, and rack means on the carriage engageable with said check gear as said pinion leaves said rack teeth to place a return thrust on the carriage into said starting position as said pinion leaves said rack teeth.

26. In a book copier according to claim 1, said cabinet housing therein means for supplying copy elements in sheet form and serially arranged means for electrostatically charging the copy sheets followed by an exposure aperture across which the sheet travels from the charging means and thereafter developer means receptive of the sheet after the exposure aperture, means for transporting the copy sheet along said serially arranged means, and electrical means in control of said transporting means and said driving means comprising:
a control switch;

means for energizing said charging means and said illumination means including a controlling relay under the control of said switch; and means for controlling said carriage driving means including a contact operated by said relay, and three switches one of which has a control member operated by said carriage and two of which have control members located in the path of and operated by said sheet as it travels along said serially arranged means.

27. In a book copier having a cabinet housing therein means for supplying copy elements in sheet form and serially arranged means for electrostatically charging the copy sheets followed by an exposure aperture across which the sheet travels from the means and thereafter developer means receptive of the sheet after the exposure aperture, means for transporting the copy sheet along said serially arranged means, an upwardly opening original-scanning aperture, a carriage on the cabinet and means for driving the carriage to transport an original across said scanning aperture, means illuminating said scanning aperture, an optical scanning system for transmitting an image of the original from the scanning aperture to said exposure aperture, and electrical means in control of said transporting means and said driving means comprising:

a control switch;

means for energizing said charging means and said illumination means including a controlling relay under the control of said switch; and means for controlling said carriage driving means including a contact operated by said relay, and three switches one of which has a control member operated by said carriage and two of which have control members located in the path of and operated by said sheet as it travels along said serially arranged means.

28. In a book copier according to claim 27, said one switch being a two-way switch having one operative setting which controls operation of said relay.

29. In a book copier including a cabinet having a top structure, a rear wall, a front wall having an upper end spaced below said top structure, and side walls, with a carriage reciprocably mounted over said top structure and means to move it from a position over the top structure to a position outwardly relative to said front wall and provided with a transparent window to support an original to be scanned as the carriage moves across a scanning aperture opening upwardly in said top structure adjacent to said front wall upper end:

means within the cabinet comprising a source of successive copy sheets;

means in the rear portion of the cabinet adjacent to said rear wall for moving each sheet successively through an electrostaic charger, an exposure position, and then development means;

an optical system for scanning the original as it passes across said scanning aperture and including a scanning path having a portion extending generally vertically downwardly in the cabinet spaced rearwardly from said front wall;

illuminating means located rearwardly from said scanning path and trained into said scanning aperture; and a generally vertical shielding panel located forwardly relative to said scanning path portion and spaced rearwardly from said front wall and extending in light-shielding relation between said aperture and the space between said front wall and said top structure.

30. In a book copier according to claim 29, exhaust fan means within said cabinet, said panel and said front wall defining an air passage into the cabinet for circulation of cooling air into an area adjacent to said illuminating means and said optical system.

31. In a copier having a cabinet provided with original scanning aperture means, illuminating means and optical scanning means in the front portion thereof, a light tunnel leading rearwardly from the scanning means to an exposure aperture, means for transporting a sensitized copy sheet downwardly through said exposure aperture and into and through a liquid developer tray, and squeeze rollers receiving said sheet from the tray and transporting it forwardly under said tunnel, the improvement comprising:

an air duct under and extending rearwardly along said tunnel from adjacent to said scanning means and discharging drying air onto said copy sheet as it leaves said rollers; and air impelling means drawing cooling air into said front portion of the cabinet past said illuminating means and discharging into said air duct.

32. In a copier according to claim 31, including a heater located in said air duct.

* * * * *